(12) United States Patent
Gono et al.

(10) Patent No.: US 12,202,556 B2
(45) Date of Patent: Jan. 21, 2025

(54) WORK VEHICLE

(71) Applicant: KUBOTA CORPORATION, Osaka (JP)

(72) Inventors: Tsuyoshi Gono, Osaka (JP); Susumu Takeoka, Osaka (JP); Kazutaka Fujimoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 607 days.

(21) Appl. No.: 17/541,977

(22) Filed: Dec. 3, 2021

(65) Prior Publication Data

US 2022/0281540 A1    Sep. 8, 2022

(30) Foreign Application Priority Data

Mar. 3, 2021  (JP) ................................ 2021-033397
Mar. 3, 2021  (JP) ................................ 2021-033398

(51) Int. Cl.
  *B62D 55/084*  (2006.01)
  *B60K 17/34*  (2006.01)
  (Continued)

(52) U.S. Cl.
  CPC ......... *B62D 55/0842* (2013.01); *B62D 55/04* (2013.01); *B62D 55/104* (2013.01); *B60K 17/34* (2013.01)

(58) Field of Classification Search
  CPC .. B62D 55/0842; B62D 55/04; B62D 55/104; B60K 17/34
  See application file for complete search history.

(56) References Cited

U.S. PATENT DOCUMENTS 7,328,760 B2 *  2/2008  Inaoka .................. B62D 55/15
                                                    180/9.42
8,632,138 B2 *  1/2014  Bessette ................ B62D 55/04
                                                    305/142
(Continued)

FOREIGN PATENT DOCUMENTS

JP      2004-017788 A    1/2004
JP      2018-144663 A    9/2018

OTHER PUBLICATIONS

Office Action Issued Nov. 21, 2023 in Japanese family member application No. 2021-033397 with English language translation.
(Continued)

*Primary Examiner* — Kevin Hurley
*Assistant Examiner* — Michael R Stabley
(74) *Attorney, Agent, or Firm* — Greenblum & Bernstein, P.L.C.

(57) ABSTRACT

A work vehicle includes: a body; left and right front wheels provided for the body; and left and right rear crawler units provided for the body. The rear crawler units each include: a drive wheel provided for a rear axle of the work vehicle; a front idler wheel forward of the drive wheel; a rear idler wheel backward of the drive wheel; a plurality of roller wheels between the front idler wheel and the rear idler wheel; a crawler belt wound around the drive wheel, the front idler wheel, the rear idler wheel, and the plurality of roller wheels; a track frame swingable about a swing shaft that extends in a left-right direction of the body and holding the front idler wheel, the rear idler wheel, and the plurality of roller wheels; and a position change mechanism configured to move the swing shaft in a front-back direction of the body.

9 Claims, 5 Drawing Sheets

(51) Int. Cl.
*B62D 55/04* (2006.01)
*B62D 55/104* (2006.01)

(56) References Cited

U.S. PATENT DOCUMENTS

| | | | |
|---|---|---|---|
| 8,636,326 B2 * | 1/2014 | Inaoka | B62D 55/084 |
| | | | 305/132 |
| 11,008,055 B2 * | 5/2021 | Dybro | B62D 55/116 |
| 2005/0060918 A1 | 3/2005 | Inaoka et al. | |
| 2010/0148573 A1 * | 6/2010 | Inaoka | B62D 49/0635 |
| | | | 305/125 |
| 2011/0260527 A1 | 10/2011 | Bessette | |
| 2020/0156720 A1 * | 5/2020 | Dybro | B62D 55/084 |

OTHER PUBLICATIONS

Extended European Search Report issued in European Patent Application No. 21212593.4 dated Jun. 15, 2022.

* cited by examiner

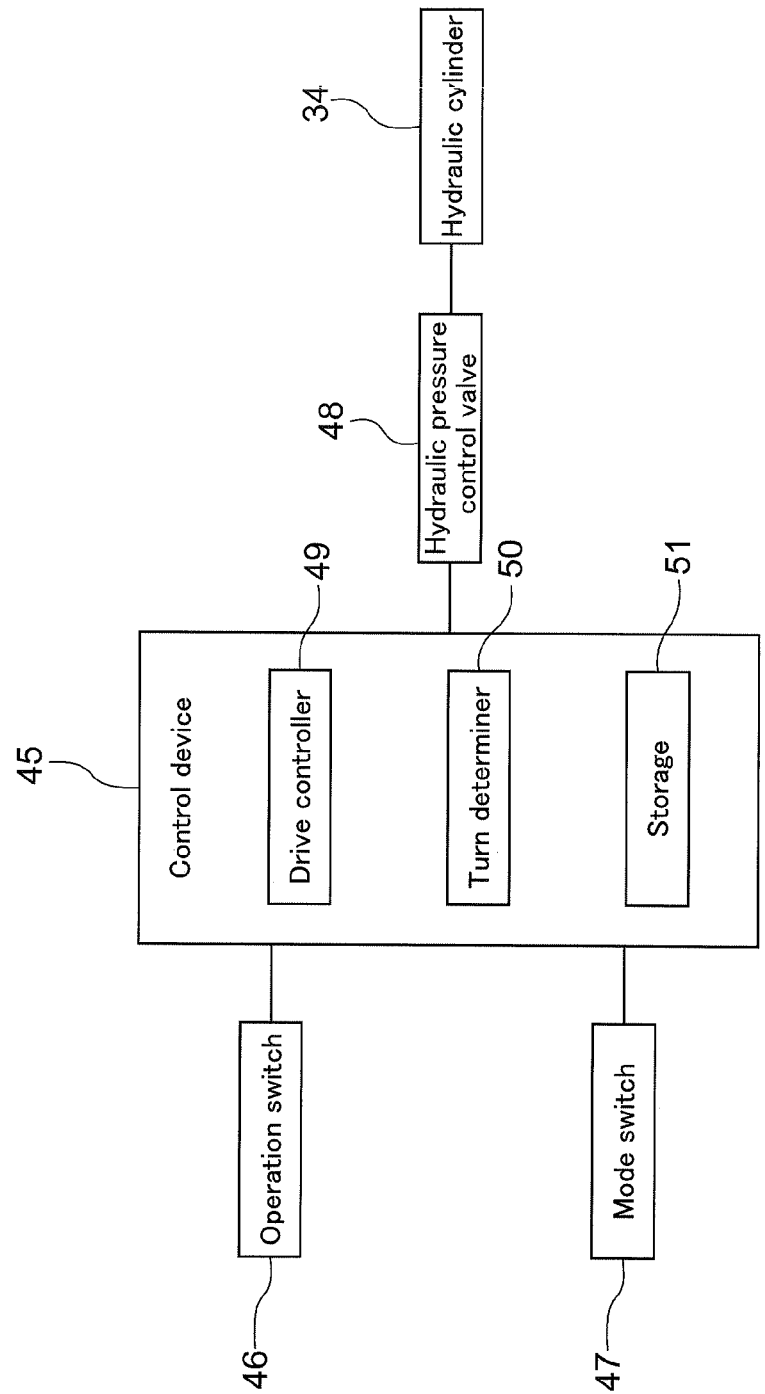

WORK VEHICLE

CROSS REFERENCE TO RELATED APPLICATIONS

This application is based on and claims priority under 35 U.S.C. Section 119 to Japanese Patent Application No. 2021-033397 filed on Mar. 3, 2021, and Japanese Patent Application No. 2021-033398, filed on Mar. 3, 2021, the entire contents of both of which are incorporated herein by reference.

TECHNICAL FIELD

The present invention relates to a work vehicle.

BACKGROUND ART

JP 2018-144663 A, for example, discloses a conventional work vehicle including a body, left and right front wheels ("front wheels (5)") provided for the body, and left and right rear crawler units ("crawler units (6)") provided for the body. The rear crawler units each include a drive wheel ("drive sprocket (30)") provided for a rear axle ("drive shaft (17)") of the work vehicle, a front idler wheel ("front-side idler wheel (33)") forward of the drive wheel, a rear idler wheel ("rear-side idler wheel (34)") backward of the drive wheel, a plurality of roller wheels ("roller wheels (35)") between the front idler wheel and the rear idler wheel, a crawler belt ("crawler belt (37)") wound around the drive wheel, the front idler wheel, the rear idler wheel, and the plurality of roller wheels, and a track frame ("track frame (31)") swingable about a swing shaft ("shaft (14)") that extends in the left-right direction of the body and holding the front idler wheel, the rear idler wheel, and the plurality of roller wheels. The work vehicle is configured such that the rear crawler units are each swingable about the swing shaft during travel.

The work vehicle disclosed in JP 2018-144663 A has room for improvement in terms of the position of the swing shaft in the front-back direction of the body to improve the traction, turnability, and performance in running through paddy fields.

The above circumstances have led to a demand for a work vehicle having improved traction, turnability, and performance in running through paddy fields.

SUMMARY OF INVENTION

The present invention characteristically includes:
a body;
left and right front wheels provided for the body; and
left and right rear crawler units provided for the body, the rear crawler units each including:
a drive wheel provided for a rear axle of the work vehicle;
a front idler wheel forward of the drive wheel;
a rear idler wheel backward of the drive wheel;
a plurality of roller wheels between the front idler wheel and the rear idler wheel;
a crawler belt wound around the drive wheel, the front idler wheel, the rear idler wheel, and the plurality of roller wheels;
a track frame swingable about a swing shaft that extends in a left-right direction of the body and holding the front idler wheel, the rear idler wheel, and the plurality of roller wheels; and
a position change mechanism configured to move the swing shaft in a front-back direction of the body.

The above characteristic configuration allows the position change mechanism to move the swing shaft in the front-back direction of the body. This allows the swing shaft to be moved in the front-back direction of the body to a position suitable for traction, turn, or running through a paddy field. The above characteristic configuration therefore allows production of a work vehicle having improved traction, turnability, and performance in running through paddy fields.

The present invention may preferably be further arranged such that the position change mechanism is configured to move the swing shaft in the front-back direction of the body between (i) a front position, at which a center of the swing shaft is forward of a center of the rear axle, and (ii) a back position, at which the center of the swing shaft is backward of the center of the rear axle.

The above characteristic configuration allows the swing shaft to be moved to the back position to increase the distance between the respective centers of the front wheels and the swing shaft in the front-back direction of the body. This in turn allows the rear crawler units to be each in close contact with the ground over the entire bottom face for increased traction. The above characteristic configuration also allows the swing shaft to be moved to the front position to reduce the distance between the respective centers of the front wheels and the swing shaft in the front-back direction of the body. This reduces the minimum turn radius to improve the turnability, and also reduces the pressure of ground contact of the front wheels to prevent the front wheels from easily damaging a paddy field while the work vehicle runs through it.

The present invention may preferably be further arranged such that the position change mechanism includes an actuator to move the swing shaft.

The above characteristic configuration uses an actuator to move the swing shaft, facilitating the movement of the swing shaft.

The present invention may preferably be further arranged such that the swing shaft is below the rear axle, and the actuator is between the rear axle and the swing shaft in a side view.

The above characteristic configuration allows the actuator to be in a space between the drive shaft and the swing shaft.

The present invention may preferably be further arranged such that the actuator includes a hydraulic cylinder configured to extend and contract in the front-back direction of the body.

With the above characteristic configuration, extending and contracting the hydraulic cylinder easily moves the swing shaft in the front-back direction of the body.

The present invention characteristically includes:
a body;
left and right front wheels provided for the body; and
left and right rear crawler units provided for the body, the rear crawler units each including:
a drive wheel provided for a rear axle of the work vehicle;
a front idler wheel forward of the drive wheel;
a rear idler wheel backward of the drive wheel;
a plurality of roller wheels between the front idler wheel and the rear idler wheel;
a crawler belt wound around the drive wheel, the front idler wheel, the rear idler wheel, and the plurality of roller wheels;
a track frame swingable about a swing shaft that extends in a left-right direction of the body and holding the front idler wheel, the rear idler wheel, and the plurality of roller wheels, the swing shaft being movable in a front-back direction of the body;

an actuator configured to move the swing shaft; and a control device configured to control how the actuator is driven.

The above characteristic configuration uses an actuator to move the swing shaft in the front-back direction of the body. This allows the swing shaft to be moved in the front-back direction of the body to a position suitable for traction, turn, or running through a paddy field. The above characteristic configuration therefore allows production of a work vehicle having improved traction, turnability, and performance in running through paddy fields. Further, the above characteristic configuration uses an actuator to move the swing shaft, facilitating the movement of the swing shaft.

The present invention may preferably be further arranged such that the control device causes the actuator to move the swing shaft in the front-back direction of the body between (i) a front position, at which a center of the swing shaft is forward of a center of the rear axle, and (ii) a back position, at which the center of the swing shaft is backward of the center of the rear axle.

The above characteristic configuration allows the swing shaft to be moved to the back position to increase the distance between the respective centers of the front wheels and the swing shaft in the front-back direction of the body. This in turn allows the rear crawler units to be each in close contact with the ground over the entire bottom face for increased traction. The above characteristic configuration also allows the swing shaft to be moved to the front position to reduce the distance between the respective centers of the front wheels and the swing shaft in the front-back direction of the body. This reduces the minimum rotation radius to improve the turnability, and also reduces the pressure of ground contact of the front wheels to prevent the front wheels from easily damaging a paddy field while the work vehicle runs through it.

The present invention may preferably be further arranged such that the control device has, as a control mode for controlling how the actuator is driven, an automatic control mode, in which the control device controls how the actuator is driven in accordance with a turn of the body.

The above characteristic configuration allows the swing shaft to be moved in accordance with a turn of the body. This eliminates the need for the driver to move the swing shaft when the driver causes the body to make a turn.

The present invention may preferably further include: an operation switch for use to drive the actuator, wherein the control device has, as the control mode, a manual control mode, in which the control device controls how the actuator is driven in response to a manual operation of the operation switch.

The above characteristic configuration allows the swing shaft to be moved in response to a manual operation of the operation switch. This allows the driver to move the swing shaft on the basis of the driver's appropriate determination.

The present invention may preferably be further arranged such that the actuator includes a hydraulic cylinder configured to extend and contract in the front-back direction of the body.

With the above characteristic configuration, extending and contracting the hydraulic cylinder easily moves the swing shaft in the front-back direction of the body.

BRIEF DESCRIPTION OF DRAWINGS

FIG. 6 is a diagram illustrating the control system of a tractor.

DESCRIPTION OF EMBODIMENTS

The description below deals with an embodiment of the present invention with reference to drawings. In the description below, arrow F indicates the forward direction of the body, arrow B indicates the backward direction of the body, arrow L indicates the leftward direction of the body, and arrow R indicates the rightward direction of the body.

[Overall Configuration of Tractor]

Figure 1:
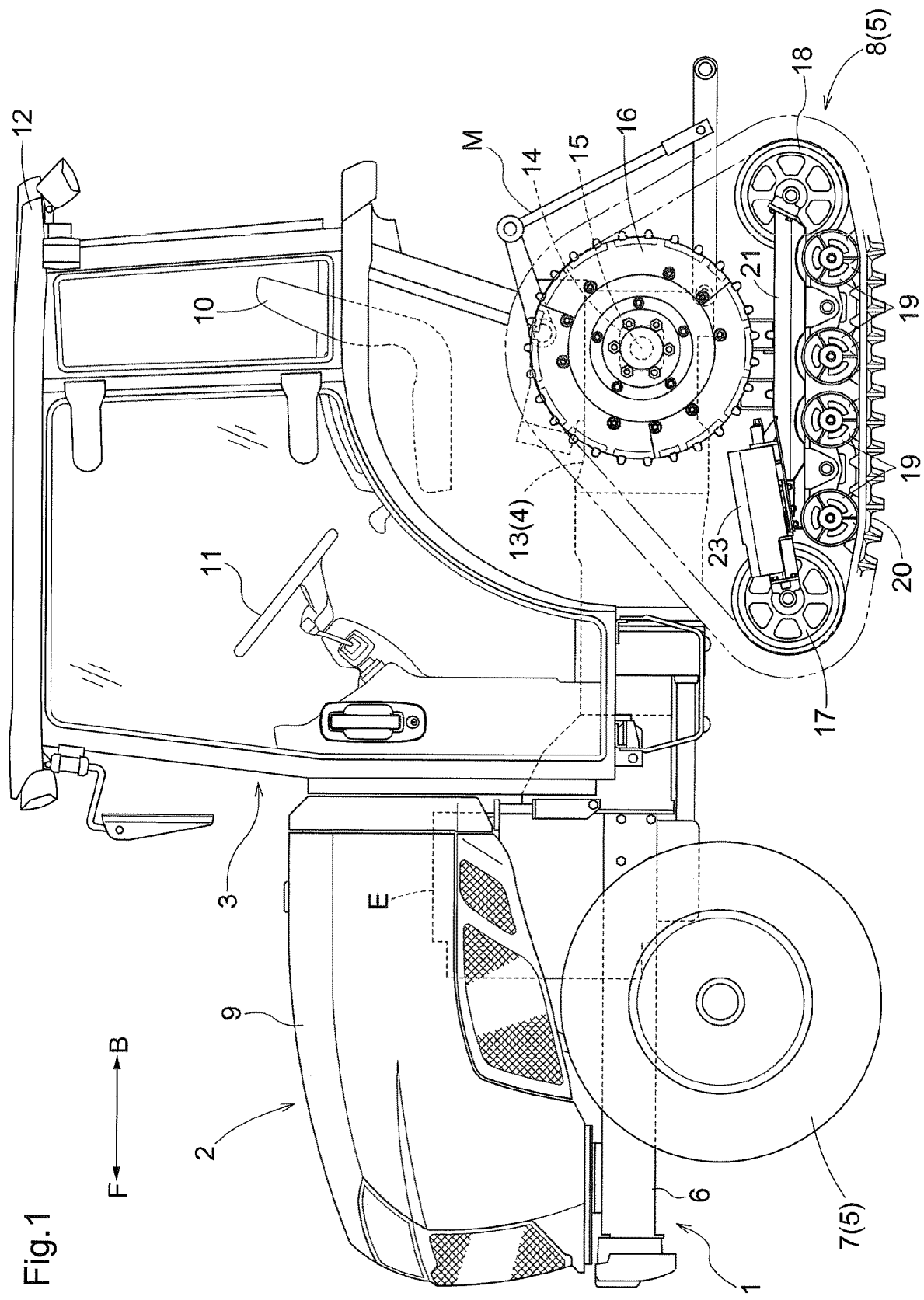
FIG. 1 is a left side view of a tractor.

FIG. 1 illustrates a tractor as an example of the "work vehicle" of the present invention. The tractor includes a body 1, a motor section 2, a driver section 3, a transmission section 4, and a work device (not shown in the drawings). The body 1 includes a travel device 5 and a body frame 6 supported by the travel device 5.

The travel device 5 includes left and right front wheels 7 and left and right rear crawler units 8. The front wheels 7 are steerable and drivable. The rear crawler units 8 are unsteerable and drivable. The tractor (body 1) is switchable between a two-wheel drive state, in which only the rear crawler units 8 are driven, and a four-wheel drive state, in which both the front wheels 7 and the rear crawler units 8 are driven.

The motor section 2 is on a front portion of the body frame 6. The motor section 2 includes an engine E and a hood 9 covering the engine E. The driver section 3 is on a back portion of the body frame 6. The driver section 3 includes a driver's seat 10 for a driver to sit on, a steering wheel 11 for use to steer the body 1, and a cabin 12 defining a space for the driver. The work device (such as a rotary tiller device) is held by a link mechanism M at a back portion of the body frame 6 in such a manner as to be capable of being lifted and lowered.

The transmission section 4 is under the driver section 3. The transmission section 4 is configured to vary power from the engine E and transmit the resulting power to the front wheels 7, the rear crawler units 8, and the work device. The transmission section 4 includes a transmission case 13. The transmission case 13 doubles as a back portion of the body frame 6. The transmission case 13 is connected to two rear axle cases 14 on the left and right sides, respectively. The rear axle cases 14 contain a rear axle 15 extending in the left-right direction of the body and configured to drive the rear crawler units 8.

[Rear Crawler Units]

Figure 2:
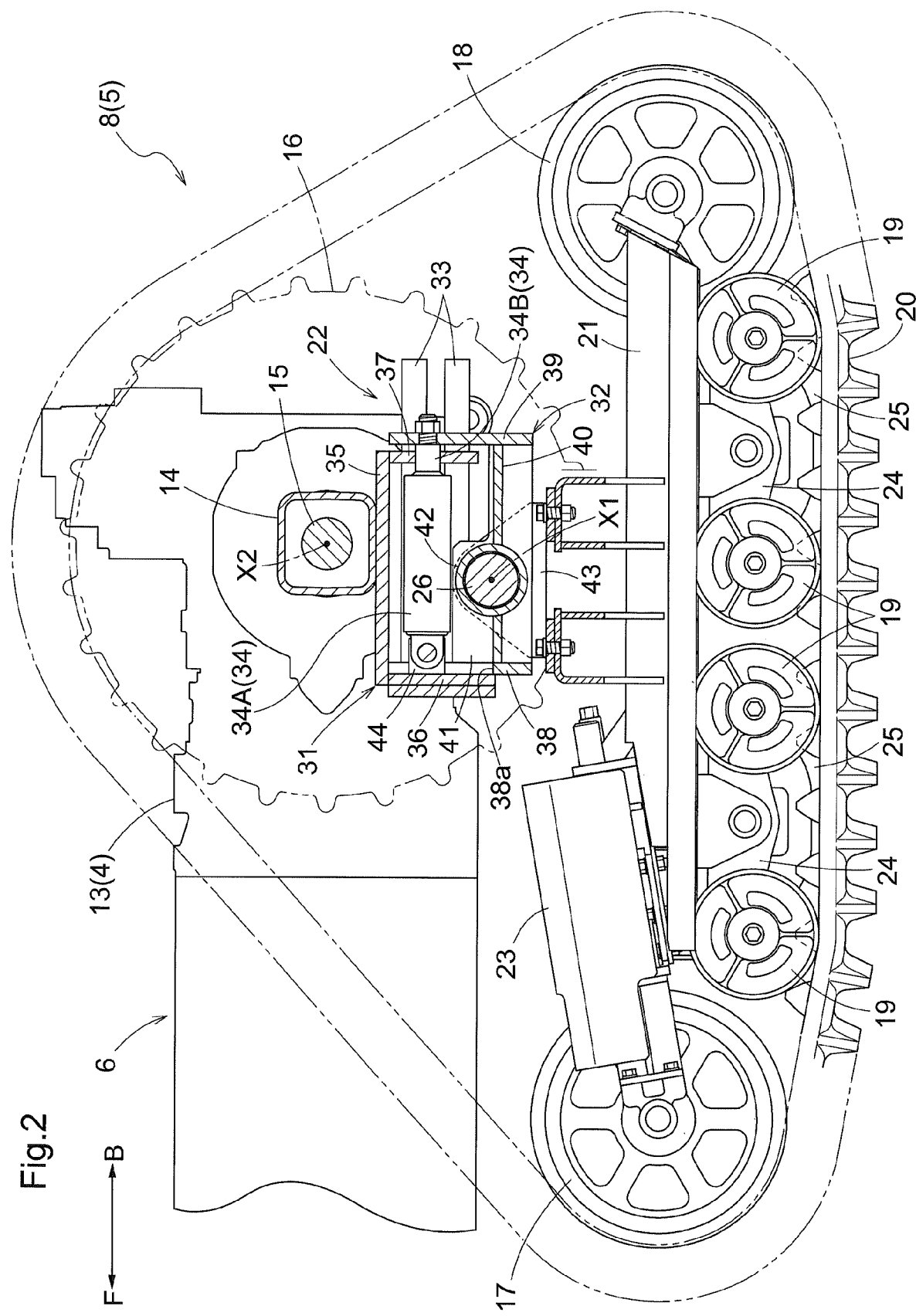
FIG. 2 is a left side view of a rear crawler unit.
Figure 3:
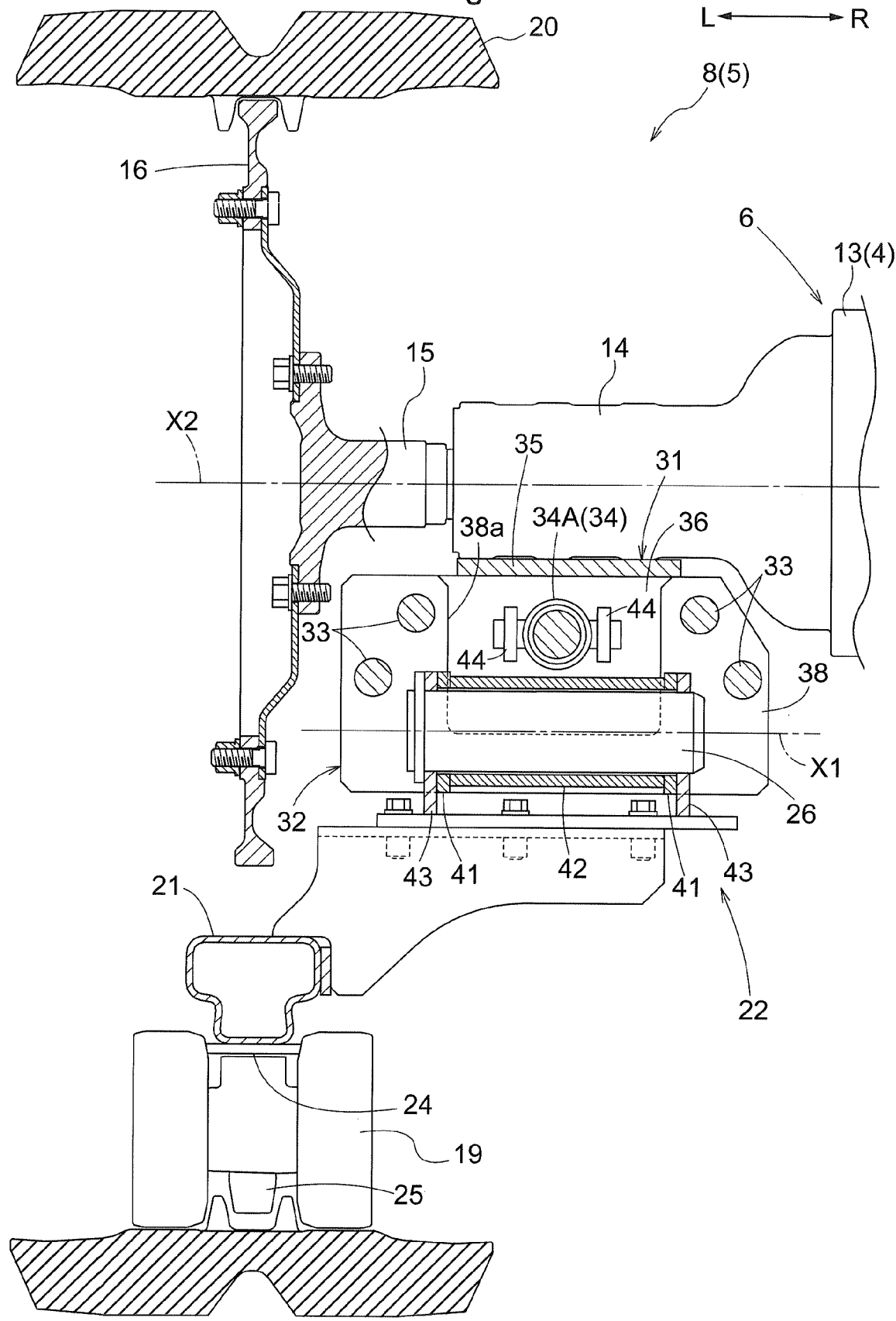
FIG. 3 is a cross-sectional view of a rear crawler unit as viewed from behind.

As illustrated in FIGS. 2 and 3, the rear crawler units 8 each include a drive wheel 16, a front idler wheel 17, a rear idler wheel 18, a plurality of (four for the present embodiment) roller wheels 19, a crawler belt 20, a track frame 21, and a position change mechanism 22. The two rear crawler units 8 are identical in configuration to each other. The description below deals with the left rear crawler unit 8 as an example.

The drive wheel 16 is provided for the rear axle 15 in such a manner as to be rotatable integrally with the rear axle 15. The front idler wheel 17 is forward of the drive wheel 16. The front idler wheel 17 is held by a front end portion of the track frame 21 by means of a tension adjustment mechanism 23 in such a manner as to be capable of adjusting the tension of the crawler belt 20. The front idler wheel 17, in other words, serves as a tension wheel. The rear idler wheel 18 is backward of the drive wheel 16. The rear idler wheel 18 is held by a back end portion of the track frame 21.

The plurality of roller wheels 19 are between the front idler wheel 17 and the rear idler wheel 18. The two front-side roller wheels 19 are held by a front-side roller wheel frame 24 at a front portion of the track frame 21. The front-side roller wheel frame 24 is provided with a front-side crawler guide 25 attached thereto and configured to guide the crawler belt 20.

The two back-side roller wheels 19 are held by a back-side roller wheel frame 24 at a back portion of the track frame 21. The back-side roller wheel frame 24 is provided with a back-side crawler guide 25 attached thereto and configured to guide the crawler belt 20.

The crawler belt 20 is wound around the drive wheel 16, the front idler wheel 17, the rear idler wheel 18, and the roller wheels 19. The track frame 21 holds the front idler wheel 17, the rear idler wheel 18, and the roller wheels 19. The track frame 21 is swingable about a swing shaft 26 extending in the left-right direction of the body. The swing shaft 26 is below the rear axle 15. The swing shaft 26 is movable in the front-back direction of the body (detailed later).

[Position Change Mechanism]

As illustrated in FIGS. 2 to 5, the position change mechanism 22 is capable of moving the swing shaft 26 in the front-back direction of the body, specifically between (i) a front position (see FIGS. 2 and 4), at which the swing shaft 26 has a center X1 forward of the center X2 of the rear axle 15, and (ii) a back position (see FIG. 5), at which the swing shaft 26 has a center X1 backward of the center X2 of the rear axle 15.

The position change mechanism 22 includes a fixed frame 31, a movable frame 32, a plurality of (four for the present embodiment) guide rods 33, and a hydraulic cylinder 34 (as an example of the "actuator" or "hydraulic cylinder" for the present invention).

The fixed frame 31 is connected to the body frame 6. The fixed frame 31 is bolted to the bottom face of the corresponding rear axle case 14. The fixed frame 31 includes an upper plate 35, a front plate 36, and a back plate 37.

The movable frame 32 is connected to the track frame 21 (swing shaft 26). The movable frame 32 is movable in the front-back direction of the body relative to the fixed frame 31. The movable frame 32 includes a front plate 38, a back plate 39, a middle plate 40, left and right side plates 41, and a boss 42.

The boss 42 extends from the left side plate 41 to the right side plate 41. The boss 42 is held by the front plate 38 and the back plate 39 by means of the middle plate 40. The swing shaft 26 is rotatably disposed through the boss 42.

The swing shaft 26 has a left end portion protruding from the left end of the boss 42 and extends through the left side plate 41. The swing shaft 26 has a right end portion protruding from the right end of the boss 42 and extends through the right side plate 41. The left and right end portions of the swing shaft 26 are each provided with a stay 43 attached thereto. The track frame 21 is held by the swing shaft 26 by means of the stays 43 in such a manner as to be swingable about the center X1 of the swing shaft 26.

The guide rods 33 are disposed through both the fixed frame 31 and the movable frame 32. Specifically, the guide rods 33 extend through the front plate 36, the front plate 38, the back plate 37, and the back plate 39. The guide rods 33 are each in the form of a round bar. The movable frame 32 is guided by the guide rods 33 when moved in the front-back direction of the body relative to the fixed frame 31.

The hydraulic cylinder 34 serves as an actuator to move the swing shaft 26. The hydraulic cylinder 34 is capable of extending and contracting in the front-back direction of the body. The hydraulic cylinder 34 is disposed through both the fixed frame 31 and the movable frame 32. The hydraulic cylinder 34 is below the corresponding rear axle case 14. Specifically, the hydraulic cylinder 34 is between the upper plate 35 and the boss 42. The hydraulic cylinder 34 is, in other words, between the rear axle 15 and the swing shaft 26 in a side view.

The hydraulic cylinder 34 includes a cylinder tube 34A and a piston rod 34B. The cylinder tube 34A includes a base portion held by the front plate 36 by means of a stay 44. The front plate 38 has an opening 38a to receive the stay 44 and the cylinder tube 34A. The piston rod 34B extends through the back plate 37. The piston rod 34B includes a leading end portion connected to the back plate 39.

Figure 4:
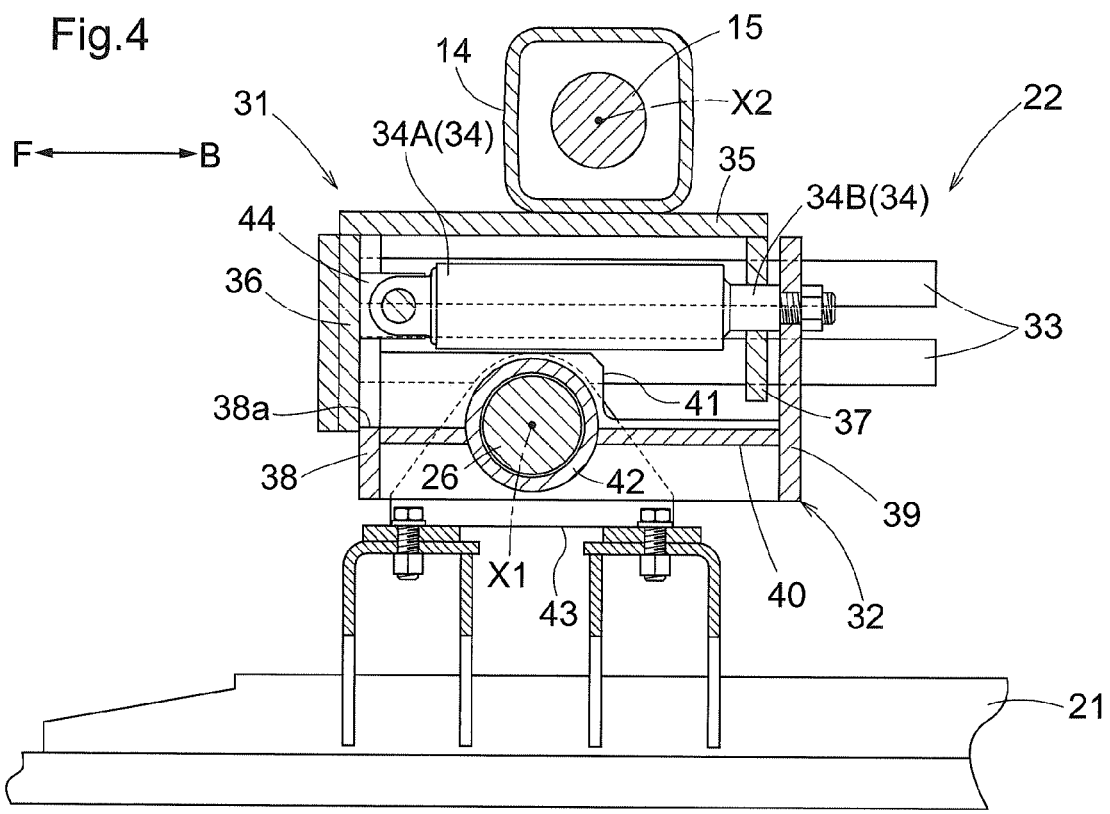
FIG. 4 is a left side view of a position change mechanism with a swing shaft at a front position.

As illustrated in FIG. 4, contracting the hydraulic cylinder 34 causes the movable frame 32 to move forward together with the swing shaft 26 and the track frame 21. This moves the swing shaft 26 to the front position.

Figure 5:
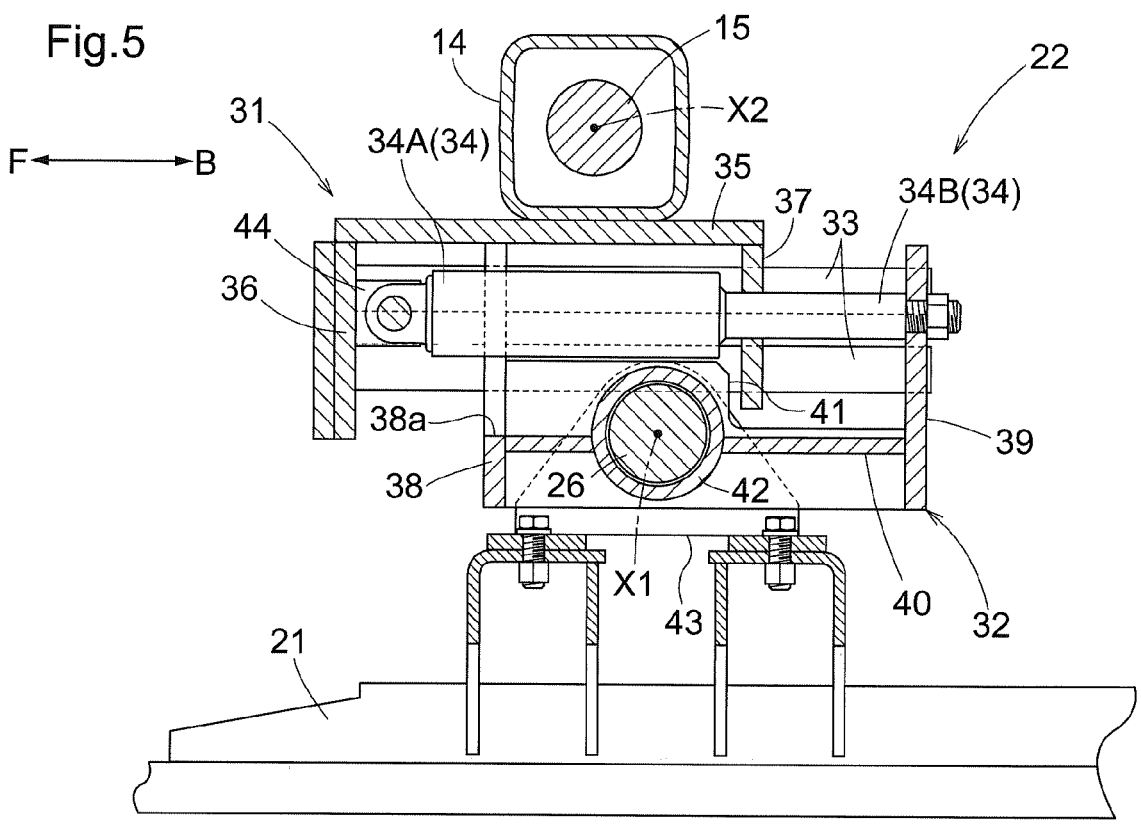
FIG. 5 is a left side view of a position change mechanism with a swing shaft at a back position.

As illustrated in FIG. 5, extending the hydraulic cylinder 34 causes the movable frame 32 to move backward together with the swing shaft 26 and the track frame 21. This moves the swing shaft 26 to the back position.

[Control System]

FIG. 6 shows the control system of the tractor, which includes a control device 45, an operation switch 46, a mode switch 47, and a hydraulic pressure control valve 48. The control device 45 includes a drive controller 49, a turn determiner 50, and a storage 51.

The drive controller 49 is configured to control how the hydraulic cylinder 34 is driven. Specifically, the drive controller 49 is configured to cause the hydraulic cylinder 34 to move the swing shaft 26 in the front-back direction of the body between the front position and the back position. The swing shaft 26 for the present embodiment is movable between two positions, namely a front position and a back position. The drive controller 49 opens and closes the hydraulic pressure control valve 48 to extend and contract the hydraulic cylinder 34. The drive controller 49 has the following two modes as its mode for controlling how the hydraulic cylinder 34 is driven: an autonomous control mode, in which the way the hydraulic cylinder 34 is driven is controlled in accordance with a turn of the body 1, and a manual control mode, in which the way the hydraulic cylinder 34 is driven is controlled in response to a manual operation of the operation switch 46.

The turn determiner 50 is configured to determine whether the body 1 is going to make (or making) a turn. In response to a predetermined operation on the tractor, the turn determiner 50 determines that the body 1 is going to make a turn. Examples of the predetermined operation include the following: the front wheels 7 have been turned by a turning angle not smaller than a predetermined angle; the front wheel 7 on the outer side of a turn has been driven to rotate at a rate approximately twice as high as that of the rear crawler unit 8; the front wheel 7 on the outer side of a turn has been driven to rotate at a rate approximately twice as high as that of the rear crawler unit 8 while the other rear crawler unit 8 on the inner side has been braked; the tractor has been steered in the two-wheel drive state to make a turn; the steering wheel 11 has been turned by a large amount, and the work device has been lifted automatically; and the body 1 has been driven to travel backward, and the work device has been lifted automatically.

The storage 51 stores programs for sections such as the drive controller 49 and the turn determiner 50 to perform their various functions, as well as data on settings of the automatic control mode and the manual control mode.

The operation switch 46 is for use to drive the hydraulic cylinder 34. The operation switch 46 is manually operable to open and close the hydraulic pressure control valve 48 to extend and contract the hydraulic cylinder 34. The operation switch 46 is configured to generate an instruction to extend the hydraulic cylinder 34 (extension instruction) and an instruction to contract the hydraulic cylinder 34 (contraction instruction). The mode switch 47 is for use to switch the control mode between the automatic control mode and the manual control mode.

In the automatic control mode, the drive controller 49 contracts the hydraulic cylinder 34 in response to the turn determiner 50 determining that the body 1 is going to make a turn. This moves the swing shaft 26 to the front position. Further, in the automatic control mode, the drive controller 49 extends the hydraulic cylinder 34 in response to the turn determiner 50 determining that the body 1 is not going to make a turn (for example, during traction). This moves the swing shaft 26 to the back position.

In the manual control mode, the drive controller 49 extends and contracts the hydraulic cylinder 34 in response to a manual operation on the operation switch 46. Specifically, in the manual control mode, the drive controller 49 contracts the hydraulic cylinder 34 in response to a contraction instruction from the operation switch 46. This moves the swing shaft 26 to the front position. Further, in the manual control mode, the drive controller 49 extends the hydraulic cylinder 34 in response to an extension instruction from the operation switch 46. This moves the swing shaft 26 to the back position.

ALTERNATIVE EMBODIMENTS (1) The embodiment described above is arranged such that the swing shaft 26 is movable between two positions, namely a front position and a back position. The swing shaft 26 may, however, alternatively be movable to not only the front position and the back position but also one or more intermediate positions between the front position and the back position. The swing shaft 26 may further alternatively be movable steplessly between the front position and the back position.

(2) The embodiment described above is arranged such that the rear crawler units 8 each include four roller wheels 19. The number of roller wheels 19 is, however, not limited to four. The rear crawler units 8 may alternatively each include three roller wheels 19, for example.

(3) The embodiment described above is arranged such that the actuator for the present invention is a hydraulic cylinder 34. The actuator for the present invention is, however, not limited to a hydraulic cylinder 34. The actuator for the present invention may alternatively be, for example, a hydraulic motor or an electric motor.

(4) The embodiment described above is arranged such that the control device 45 has a manual control mode and an automatic control mode as its control mode. The control device 45 may, however, alternatively have only either a manual control mode or an automatic control mode as its control mode.

The invention claimed is:

1. A work vehicle, comprising:
    a body;
    left and right front wheels provided for the body; and
    left and right rear crawler units provided for the body,
    the rear crawler units each including:
    a drive wheel provided for a rear axle of the work vehicle;
    a front idler wheel forward of the drive wheel;
    a rear idler wheel backward of the drive wheel;
    a plurality of roller wheels between the front idler wheel and the rear idler wheel;
    a crawler belt wound around the drive wheel, the front idler wheel, the rear idler wheel, and the plurality of roller wheels;
    a track frame swingable about a swing shaft that extends in a left-right direction of the body and holding the front idler wheel, the rear idler wheel, and the plurality of roller wheels;
    a position change mechanism configured to move the swing shaft in a front-back direction of the body, and
    the position change mechanism includes an actuator to move the swing shaft.

2. The work vehicle according to claim 1, wherein the position change mechanism is configured to move the swing shaft in the front-back direction of the body between (i) a front position, at which a center of the swing shaft is forward of a center of the rear axle, and (ii) a back position, at which the center of the swing shaft is backward of the center of the rear axle.

3. The work vehicle according to claim 1, wherein
    the swing shaft is below the rear axle, and
    the actuator is between the rear axle and the swing shaft in a side view.

4. The work vehicle according to claim 1, wherein
    the actuator includes a hydraulic cylinder configured to extend and contract in the front- back direction of the body.

5. A work vehicle, comprising:
    a body;
    left and right front wheels provided for the body; and
    left and right rear crawler units provided for the body,
    the rear crawler units each including:
    a drive wheel provided for a rear axle of the work vehicle;
    a front idler wheel forward of the drive wheel;
    a rear idler wheel backward of the drive wheel;
    a plurality of roller wheels between the front idler wheel and the rear idler wheel;
    a crawler belt wound around the drive wheel, the front idler wheel, the rear idler wheel, and the plurality of roller wheels;
    a track frame swingable about a swing shaft that extends in a left-right direction of the body and holding the front idler wheel, the rear idler wheel, and the plurality of roller wheels, the swing shaft being movable in a front-back direction of the body;
    an actuator configured to move the swing shaft; and
    a control device configured to control how the actuator is driven.

6. The work vehicle according to claim 5, wherein
    the control device causes the actuator to move the swing shaft in the front-back direction of the body between (i) a front position, at which a center of the swing shaft is forward of a center of the rear axle, and (ii) a back position, at which the center of the swing shaft is backward of the center of the rear axle.

7. The work vehicle according to claim 5, wherein
the control device has, as a control mode for controlling how the actuator is driven, an automatic control mode, in which the control device controls how the actuator is driven in accordance with a turn of the body.

8. The work vehicle according to claim 7, further comprising:
an operation switch for use to drive the actuator,
wherein the control device has, as the control mode, a manual control mode, in which the control device controls how the actuator is driven in response to a manual operation of the operation switch.

9. The work vehicle according to claim 5, wherein
the actuator includes a hydraulic cylinder configured to extend and contract in the front-back direction of the body.

* * * * *